(12) United States Patent
Tian et al.

(10) Patent No.: US 9,690,261 B2
(45) Date of Patent: Jun. 27, 2017

(54) METHOD FOR AUTOMATICALLY SETTING RESPONSIVENESS PARAMETERS FOR MOTION CONTROL SYSTEMS

(71) Applicant: LINESTREAM TECHNOLOGIES, Cleveland, OH (US)

(72) Inventors: Gang Tian, Westlake, OH (US); Ahmed H. El-Shaer, Westlake, OH (US)

(73) Assignee: LINESTREAM TECHNOLOGIES, Cleveland, OH (US)

( * ) Notice: Subject to any disclaimer, the term of this patent is extended or adjusted under 35 U.S.C. 154(b) by 561 days.

(21) Appl. No.: 13/926,052

(22) Filed: Jun. 25, 2013

(65) Prior Publication Data

US 2014/0379102 A1    Dec. 25, 2014

(51) Int. Cl.
*G05B 11/01* (2006.01)
(52) U.S. Cl.
CPC .................................. *G05B 11/01* (2013.01)
(58) Field of Classification Search
None
See application file for complete search history.

(56) References Cited

U.S. PATENT DOCUMENTS

| | | | | |
|---|---|---|---|---|
| 2,402,108 A | * | 6/1946 | Willard | G08C 19/48 318/692 |
| 4,839,573 A | * | 6/1989 | Wise | G05B 13/0245 318/611 |

(Continued)

FOREIGN PATENT DOCUMENTS

| | | |
|---|---|---|
| EP | 1 968 184 | 9/2008 |
| EP | 1968184 | 9/2008 |
| JP | 2002-023807 | 1/2002 |

OTHER PUBLICATIONS

International Search Report of the International Searching Authority for International Patent Application No. PCT/US 14/43788 dated Mar. 10, 2015, 4 pages.
Written Opinion of the International Searching Authority for International Patent Application No. PCT/US 14/43788 dated Mar. 10, 2015, 7 pages.

(Continued)

*Primary Examiner* — Robert Fennema
*Assistant Examiner* — Jay Jung
(74) *Attorney, Agent, or Firm* — Amin, Turocy & Watson, LLP

(57) ABSTRACT

Robustly stabilizing controller bandwidth for a controlled mechanical system is determined as a function of the system's estimated inertia and dominant system parameters that define constraints on the bandwidth. In one or more embodiments, a bandwidth model is derived that defines a relationship between robustly stabilizing controller bandwidth and system gain over a range of reasonable system uncertainties. Using the model, a suitable controller bandwidth can be determined for a given motion control system given only estimates of the system gain and the dominant parameters(s) that constrain the bandwidth. In an example two-inertia system, the system gain and dominant parameter can comprise system inertia and mechanical coupling stiffness, respectively. Accordingly, estimates of the system inertia and coupling stiffness can be provided to the system, which determines a suitable controller bandwidth for the motion control system characterized by the estimates.

20 Claims, 14 Drawing Sheets

(56) References Cited

U.S. PATENT DOCUMENTS

| | | | | |
|---|---|---|---|---|
| 6,037,736 | A * | 3/2000 | Tsuruta | H02P 23/0045 318/609 |
| 6,198,246 | B1 * | 3/2001 | Yutkowitz | G05B 11/42 318/561 |
| 6,567,711 | B1 * | 5/2003 | Hosek | G05B 13/021 180/197 |
| 7,119,511 | B2 * | 10/2006 | Sri-Jayantha | G11B 7/08505 318/560 |
| 7,450,110 | B2 * | 11/2008 | Shahoian | G06F 1/1616 178/18.01 |
| 8,041,436 | B2 * | 10/2011 | Gao | G05B 5/01 318/561 |
| 8,060,340 | B2 * | 11/2011 | Gao | G05B 13/04 702/182 |
| 8,180,464 | B2 | 5/2012 | Gao et al. | |
| 2001/0014834 | A1 * | 8/2001 | Shah | G05B 13/042 700/29 |
| 2005/0285558 | A1 * | 12/2005 | Watt | G05B 13/041 318/632 |
| 2006/0055357 | A1 * | 3/2006 | Rijs | G05B 19/19 318/561 |
| 2007/0073442 | A1 * | 3/2007 | Aghili | B25J 9/1605 700/245 |
| 2008/0224648 | A1 * | 9/2008 | Umeda | G05B 19/315 318/648 |
| 2009/0204233 | A1 * | 8/2009 | Zhan | G05B 17/02 700/29 |
| 2012/0001582 | A1 * | 1/2012 | Park | G05B 13/048 318/610 |
| 2013/0026963 | A1 * | 1/2013 | Sonoda | H02P 23/14 318/561 |
| 2013/0278196 | A1 | 10/2013 | Tian | |
| 2013/0307459 | A1 | 11/2013 | Tian | |

OTHER PUBLICATIONS

European Search Report for Patent Application No. 14155303.2-1807 Dated Jul. 16, 2014, 10 pgs.

Kemin Zhou, John C. Dyle, Keith Glover: "Robust and Optimal Control", Jul. 8, 1995, pp. 261-290.

Gene Franklin, J.D. Powell, Abbas Emami-Naeini: "Feedback Control of Dynamic Systems 6/E", Sep. 23, 2009, pp. 356-356.

Gouguang Zhang et al: "Speed Control of Two-Interia System by PI/PID Control", IEEE Transactions on Industrial Electronics, IEEE Service Center, Piscataway, NJ, USA, vol. 47, No. 3, Jun. 1, 2000, pp. 603-609.

S. Tungpataratanawong, et al: "High Performance Robust Motion Control of Industrial Robot Using Parameter Identification Based on Resonant Frequency", Industrial Electronics Society, 30th Annual Conference of IEEE Busan, South Korea, Nov. 2-6, 2004, vol. 1, Nov. 2, 2004, pp. 111-116.

Extended European Search Report for European Application No. 141553012-1807 Dated Jul. 16, 2014, 10 pages.

Kemin Zhou, et al. "Robust and optimal control", Robust and Optimal Control, Jul. 8, 1995, New Jersey, pp. 261-290.

Gene Franklin, et al. "Feedback Control of Dynamic Systems, 6/E", Feedback Control of Dynamic Systems, 6/E, Sep. 23, 2009, pp. 356-356.

Gouguang Zhang, et al. "Speed Control of Two-Inertia System by PI/PID Control", IEEE Transactions on Industrial Electronics, IEEE Service Center, Jun. 1, 2000, pp. 603-609, vol. 47, No. 3, Piscataway, New Jersey.

S. Tungpataratanawong, et al. "High Performance Robust Motion Control of Industrial Robot Using Parameter Identification Based on Resonant Frequency", Industrial Electronics Society, 30th Annual Conference of IEEE, Busan, South Korea, Nov. 2, 2004, pp. 111-116, Piscataway, New Jersey.

European Office Action for European Application No. 14 155 303.2 mailed on Mar. 16, 2016.

* cited by examiner

METHOD FOR AUTOMATICALLY SETTING RESPONSIVENESS PARAMETERS FOR MOTION CONTROL SYSTEMS

TECHNICAL FIELD

This disclosure generally relates to motion control, and specifically to automatic determination of a robust stabilizing bandwidth for a controller for a range of reasonable system uncertainties.

BACKGROUND

Many automation applications employ motion control systems to control machine position and speed. Such motion control systems typically include one or more motors or similar actuating devices operating under the guidance of a controller, which sends position and speed control instructions to the motor in accordance with a user-defined control algorithm. Some motion control systems operate in a closed-loop configuration, whereby the controller instructs the motor to move to a target position or to transition to a target velocity (a desired state) and receives feedback information indicating an actual state of the motor. The controller monitors the feedback information to determine whether the motor has reached the target position or velocity, and adjusts the control signal to correct errors between the actual state and the desired state.

Designers of motion control systems seek to achieve an optimal trade-off between performance and system stability. For example, an aggressively tuned controller may result in a system that tracks a desired position with high accuracy and a fast response time, but may be rendered unstable in the presence of system noise and uncertainties. Alternatively, tuning the controller more conservatively will improve system stability, but at the expense of performance. Ideally, the controller gain coefficients should be selected to optimize this trade-off between performance and system stability. The process of selecting suitable gain coefficients for the controller is known as tuning.

Turning the gain coefficients for a given controller determines the controller's bandwidth, which is a measure of responsiveness of the controlled mechanical system to changes in the control signal. The response of the controlled system to a signal from a controller is partially a function of the controller's bandwidth and the physical characteristics of the mechanical system (e.g., inertia, damping, friction, coupling stiffness, etc.). In general, higher controller bandwidths will result in faster output response to control signals, better disturbance rejection, and smaller tracking error. However, setting the bandwidth too high can introduce system instability by rendering the system more sensitive to noise and reducing closed-loop robustness (the ability of the system to remain stable over a range of reasonable system uncertainties and disturbances), particularly in the presence of inherently uncertain motor-load dynamics. For example, for lightly damped motion systems, excessively high controller bandwidth can over-excite the system resulting in undesirable oscillations, which in turn may cause controller saturation as the controller attempts to stabilize the resulting oscillations. The system can be rendered more stable by reducing the controller bandwidth, but at the expense of performance. For at least these reasons, controller bandwidth for a given motion control system must be carefully selected to achieve robust performance and robust stability.

The above-described is merely intended to provide an overview of some of the challenges facing conventional motion control systems. Other challenges with conventional systems and contrasting benefits of the various non-limiting embodiments described herein may become further apparent upon review of the following description.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its purpose is to present some concepts of one or more embodiments in a simplified form as a prelude to the more detailed description that is presented later.

One or more embodiments of the present disclosure relate to systems and methods for automatically determining suitable controller bandwidths that achieve closed-loop robust stability and yield good control performance. To these and other ends, robust stability analysis is a framework of choice used to model a relationship between robustly stabilizing bandwidth values and the system's dominant parameters which constrain the bandwidth values. Using this model, a suitable controller bandwidth for a given motion control system can be determined automatically based on estimates of the system gain and dominant constraints, thereby mitigating time consumption involved in trial-and-error methods.

In an exemplary motion control system, the system gain may be given by the system inertia (e.g., motor inertia and load inertia), and the dominant constraint of the system may be the resonant mode of a coupled motor-load system. Accordingly, the bandwidth estimation system determines a robustly stabilizing controller bandwidth for the system by providing estimates of the system inertia and mechanical coupling stiffness (the dominant constraint) to the bandwidth estimation model. The inertia and stiffness estimates can be determined by any suitable means and provided to the bandwidth estimator to facilitate calculation of a suitable bandwidth. However, one or more embodiments may include an inertia estimation system that automatically generates an estimate of the system's inertia based on system response to test signals. The resulting inertia calculations can then be provided to the bandwidth estimator to facilitate calculation of a suitable controller bandwidth. Moreover, one or more embodiments may include a system that determines estimates of coupling stiffness and damping based on closed-loop analysis.

The following description and the annexed drawings set forth herein detail certain illustrative aspects of the one or more embodiments. These aspects are indicative, however, of but a few of the various ways in which the principles of various embodiments can be employed, and the described embodiments are intended to include all such aspects and their equivalents.

DETAILED DESCRIPTION

Figure 1:
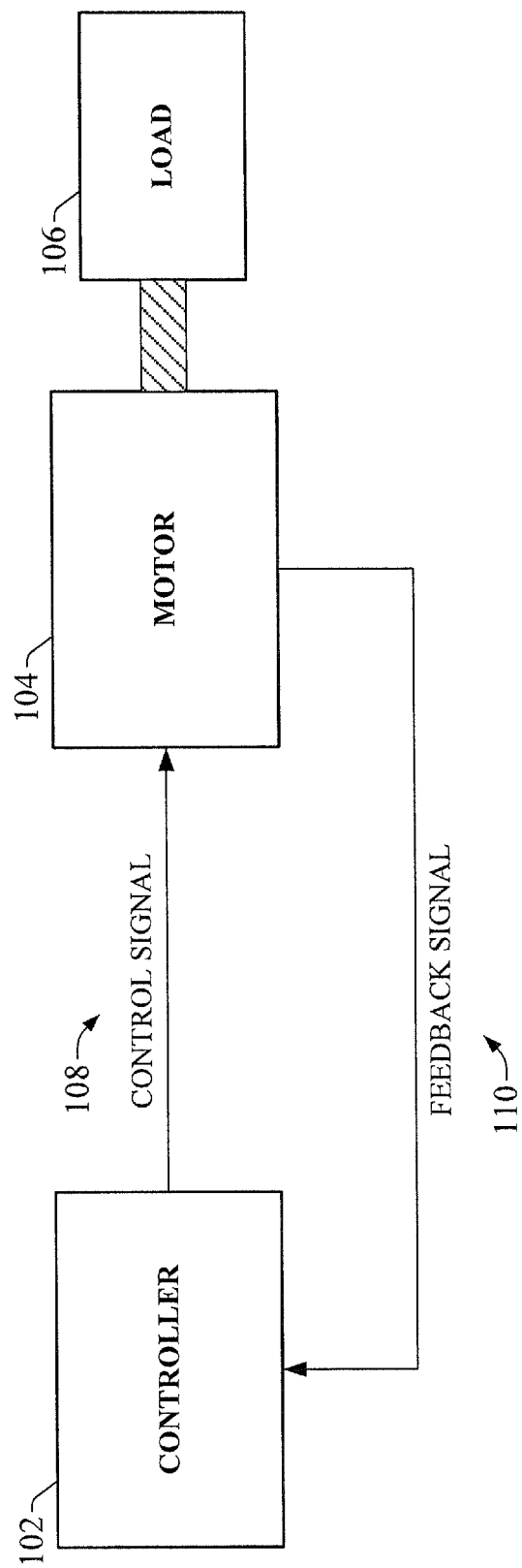
FIG. 1 is a block diagram of a simplified closed-loop motion control architecture.

Various embodiments are now described with reference to the drawings, wherein like reference numerals refer to like elements throughout. In the following description, for the purposes of explanation, numerous specific details are set forth in order to provide an understanding of this disclosure. It is emphasized, however, that such embodiments may be practiced without these specific details, or with other methods, components, materials, etc. In other instances, structures and devices are shown in block diagram form to facilitate describing one or more embodiments.

Systems and methods described herein relate to techniques for determining controller bandwidths that achieve robust stability for closed-loop motion control systems given the systems' dominant parameters that constrain the bandwidths. According to one or more embodiments, robust stability analysis can be used to produce the controller bandwidth as a function of the dominant system parameters that define the constraints of the bandwidth values (e.g., mechanical resonant mode) over a range of reasonable system uncertainties. Once established, this fixed relationship can be used to determine suitable controller bandwidths for specific motion control applications of a given type (e.g., two-inertia motor-load systems) by providing only the system gain and dominant constraints of the system being tuned. The techniques described herein can mitigate the need to tune the controller bandwidth manually using trial-and-error methods, while enhancing closed-loop performance and improving the speed of disturbance estimation and cancellation by determining a bandwidth that results In robust performance without sacrificing stability.

FIG. 1 depicts a simplified closed-loop motion control architecture. Controller 102 is programmed to control motor 104, which drives mechanical load 106. Controller 102, motor 104, and load 106 comprise the primary components of an exemplary motion control system. In an exemplary non-limiting application, load 106 can represent an axis of a single- or multi-axis robot or positioning system. In such applications, controller 102 sends control signal 108 instructing the motor 104 to move the load 106 to a desired position at a desired speed. The control signal 108 can be provided directly to the motor 104, or to a motor drive (not shown) that controls the power delivered to the motor 104 (and consequently the speed and direction of the motor). Feedback signal 110 indicates a current state (e.g., position, velocity, etc.) of the motor 104 and/or load 106 in real-time. In servo-driven systems, feedback signal 110 can be generated, for example, by an encoder or resolver (not shown) that tracks an absolute or relative position of the motor. In other types of systems, feedback signal 110 may originate from the load (e.g., via measurement of the load's position or speed). In sensorless systems lacking a position/velocity sensor, the feedback signal can be provided by a speed/position estimator. During a move operation, the controller monitors feedback signal 110 to ensure that the load 106 has accurately reached the target position. The controller 102 compares the actual position of the load as indicated by the feedback signal 110 with the target position, and adjusts the control signal 108 as needed to reduce or eliminate error between the actual and target positions.

In another exemplary application, load 106 can represent a spinning load (e.g., a pump, a washing machine, a centrifuge, etc.) driven by motor 104, in which controller 102 controls the rotational velocity of the load. In this example, controller 102 provides an instruction to motor 104 (via control signal 108) to transition from a first velocity to a second velocity, and makes necessary adjustments to the control signal 108 based on feedback signal 110. It is to be appreciated that the bandwidth estimation techniques of the present application are not limited to use with the exemplary types of motion control systems described above, but are applicable for a large number of control applications (e.g., process control systems).

The control signal output generated by the controller 102 in response to an error between the desired position or velocity and the target position or velocity (as reported by the feedback signal 110) depends on the controller bandwidth, which determines the gain coefficients for the control loop. In general, higher bandwidths result in better system performance (e.g., faster controller tracking and less sensitivity to external disturbances acting on the closed loop system). However, depending on the mechanical characteristics of the controlled mechanical system, setting the controller bandwidth too high can render the system unstable by, for example, resulting in undesirable system oscillations. In many applications, design engineers employ a trial-and-error approach to identifying a suitable controller bandwidth (e.g. by manually tuning the gain coefficients control loop), since suitable bandwidth selection depends on physical characteristics of the mechanical system being controlled. For example, mechanical systems with a high inertia (resistance to acceleration or deceleration) may require relatively high initial torque to initiate a move to a new position or velocity, particularly if the application requires rapid convergence on the target position/velocity. However, high torque commands increase the possibility of overshoot, necessitating a reverse correction to bring the system back to the target. An unsuitable controller bandwidth can result in undesired mechanical oscillations as the system performs multiple corrective iterations before settling on the target position or velocity. Such oscillations can introduce instability, cause system delays, and consume excessive power as a result of the additional work required to bring the system to a stable state.

One or more embodiments described herein can simplify control system tuning by automatically determining a suitable controller bandwidth that provides both accurate and stable performance given only the system gain and dominant system parameters of a given control application.

Figure 2:
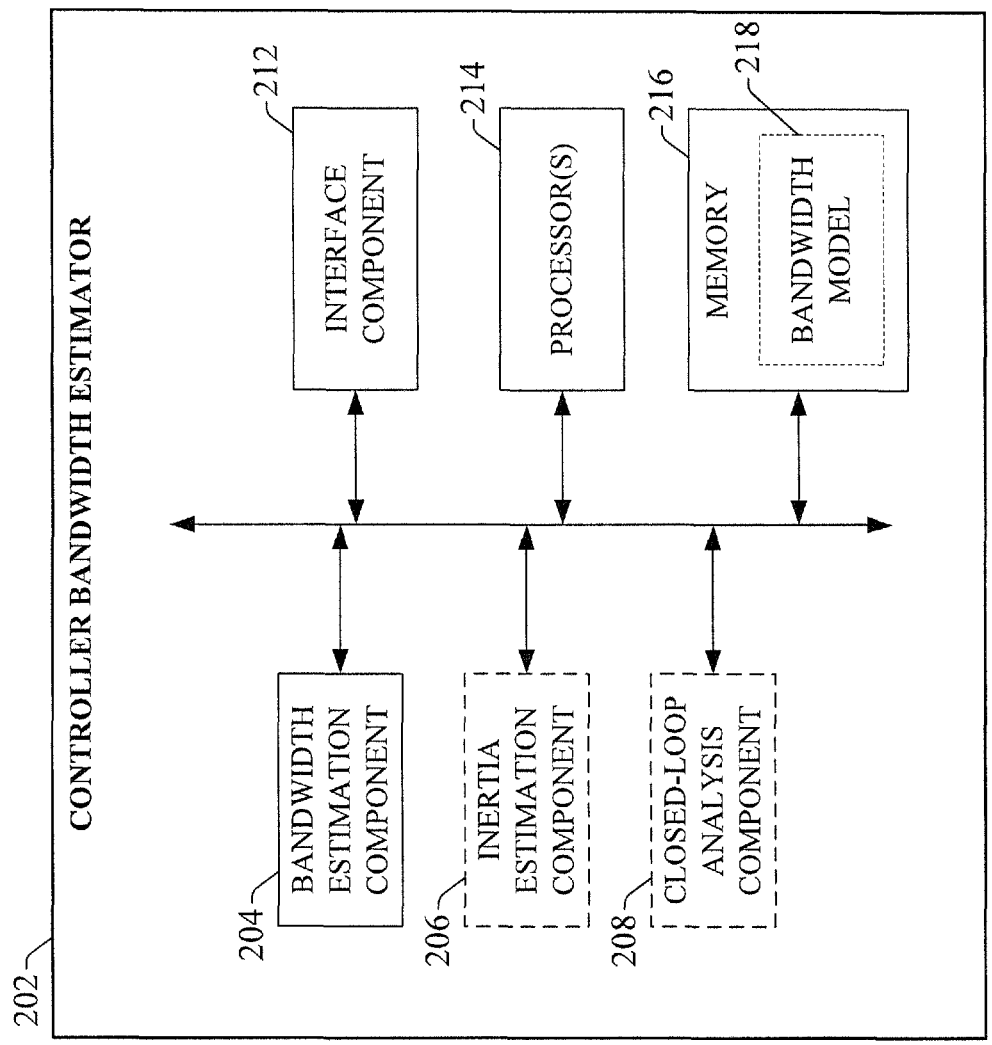
FIG. 2 is a block diagram of an exemplary non-limiting controller bandwidth estimation system.

FIG. 2 is a block diagram of an exemplary non-limiting controller bandwidth estimator capable of determining robustly stabilizing controller bandwidths based on a system's gain and one or more dominant constraints. Controller bandwidth estimator 202 can comprise a bandwidth estimation component 204, an interface component 212, one or more processors 214, and memory 216. Memory 216 can store a pre-computed reference bandwidth model 218 that produces a desired functional relationship between the controller bandwidth and system gain for a range of reasonable system uncertainties (e.g., mechanical uncertainties, sensor noise, etc.). In some embodiments, controller bandwidth estimator 202 can also optionally include an inertia estimation component 206 and/or a closed-loop analysis component 208. In various embodiments, one or more of the bandwidth estimation component 204, inertia estimation component 206, closed-loop analysis component 208, interface component 212, the one or more processors 214, and memory 216 can be electrically and/or communicatively coupled to one another to perform one or more of the functions of the controller bandwidth estimator 202. In some embodiments, components 204, 206, 208, and 212 can comprise software instructions stored on memory 216 and executed by processor(s) 214. The controller bandwidth estimator 202 may also interact with other hardware and/or software components not depicted in FIG. 2. For example, processor(s) 214 may interact with one or more external user interface device, such as a keyboard, a mouse, a display monitor, a touchscreen, or other such interface devices.

Interface component 212 can be configured to receive user input and to render output to the user in any suitable format (e.g., visual, audio, tactile, etc.). User input can be, for example, manually provided estimates of a mechanical system's gain (e.g., load and/or motor inertias), effective stiffness, damping, or other parameters that can be used by the controller bandwidth estimator 202 to determine a suitable controller bandwidth (to be described in more detail below). Bandwidth estimation component 204 can receive estimated values of the system gain and the system's dominant constraining parameter (which can be provided manually via interface component 212 or determined automatically by components 206 and 208) and reference bandwidth model 218 to determine a suitable controller bandwidth given the estimated system parameters.

Inertia estimation component 206 can generate estimates of a controlled mechanical system's inertia, which can comprise the system gain in some systems. Closed-loop analysis component 208 can generate estimates of the system's effective stiffness and/or damping using closed-loop analysis. Inertia estimation component 206 and closed-loop analysis component 208 can provide their respective parameter estimates to bandwidth estimation component 204, which can determine a suitable controller bandwidth based on the estimates.

The one or more processors 214 can perform one or more of the functions described herein with reference to the systems and/or methods disclosed. Memory 216 can be a computer-readable storage medium storing computer-executable instructions and/or information for performing the functions described herein with reference to the systems and/or methods disclosed.

Figure 3:
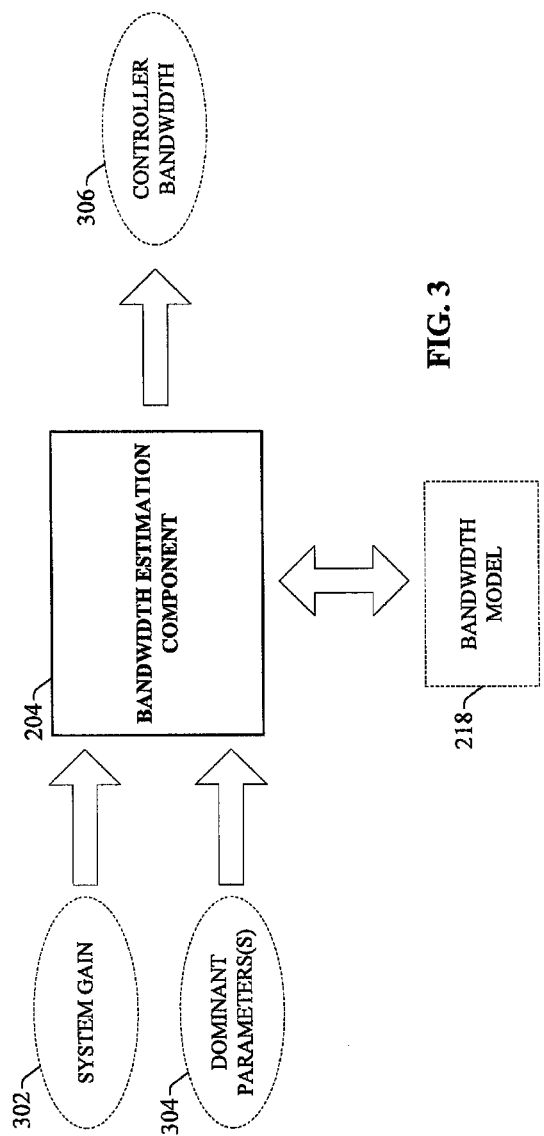
FIG. 3 is a block diagram illustrating exemplary inputs and outputs associated with controller bandwidth estimator.

FIG. 3 is a block diagram illustrating exemplary inputs and outputs associated with bandwidth estimation component 204. According to one or more embodiments, a bandwidth model 218 can be derived that models a relationship between robustly stabilizing bandwidth values and the dominant system parameters that constrain the bandwidth values. The relationship defined by bandwidth model 218 can be derived using any suitable stability analysis method, including but not limited to robust stability analysis, as will be described in more detail below. Since the defined relationship is applicable over a range of reasonable uncertainties for a given type of motion control system, bandwidth model 218 can be used to determine suitable controller bandwidths for a large number of control systems (e.g., motion control system, process control systems, etc.).

Given the fixed relationships embodied by bandwidth model 218, bandwidth estimation component 204 requires only estimated values of the system gain 302 and the system's dominant parameters(s) 304, which constrain the bandwidth values, to determine a suitable controller bandwidth 306 for a given motion control application. Specifically, bandwidth estimation component 204 can reference bandwidth model 218 to determine a suitable controller bandwidth 306 for a motion system characterized by the estimated values of system gain 302 and dominant parameter(s) 304. This controller bandwidth 306 can then be used to facilitate tuning the controller for robust stable performance.

Figure 5:
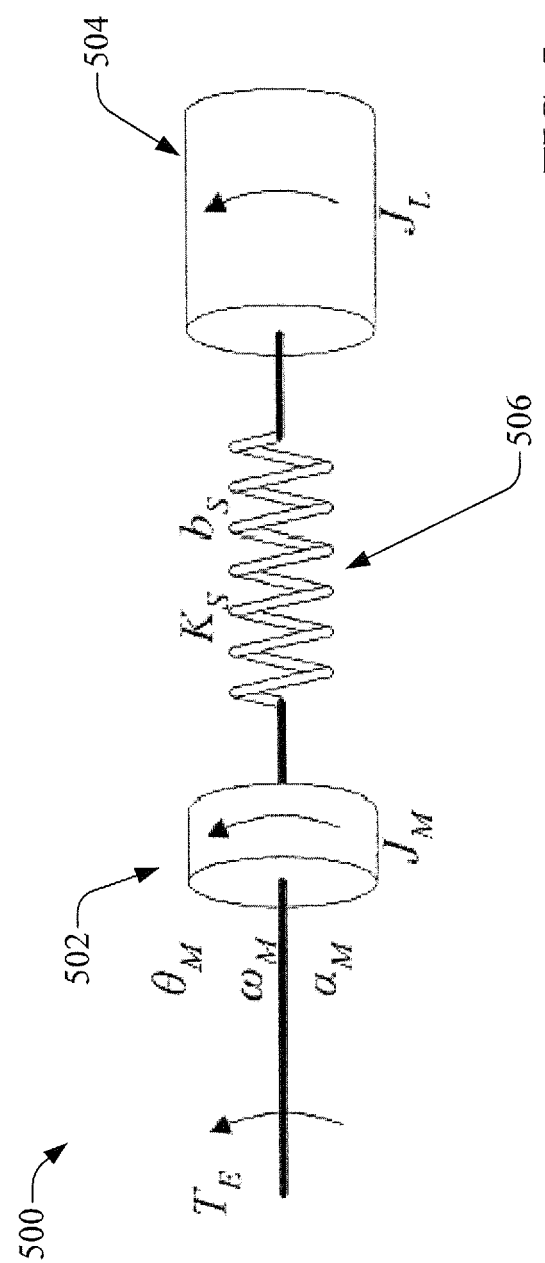
FIG. 5 is a model representing a two-inertia industrial motion drive system.

To illustrate robustly stabilizing controller bandwidth determination according to one or more embodiments, an exemplary industrial motion drive system is considered. As depicted in FIG. 5, such a drive system can be modeled as a two-inertia system 500, where the total inertia J comprises inertia $J_M$ of the motor 502 and inertia $J_L$ of the load 504. Mechanical characteristics of the coupling 506 between motor 502 and load 504 are represented by stiffness $K_S$ and damping $b_S$. Thus, in the exemplary system 500, the system gain is the inertia of the system and the dominant parameter is resonant mode of the coupled motor-load configuration. The transfer function for the two-inertia system 500 relating motor speed ($\omega_M$) to motor input torque $T_E$ is given by:

$$\frac{\omega_M}{T_E} = \frac{1}{(J_M + J_L)s} \frac{J_L S^2 + b_S S + K_S}{J_P S^2 + b_S S + K_S} \quad (1)$$

where $$J_P = \frac{J_M J_L}{(J_M + J_L)}. \quad (2)$$

In transfer function (1), the first component $$\frac{1}{(J_M + J_L)s}$$

represents rigid-body dynamics which are known from initial estimates. The second component $$-\frac{J_L S^2 + b_S S + K_S}{J_P S^2 + b_S S + K_S}-$$

represents unknown compliant dynamics due to the flexible coupling compliance. These compliance dynamics represented by the second component represent limiting uncertainty in setting the bandwidth of the closed-loop controller.

Figure 4:
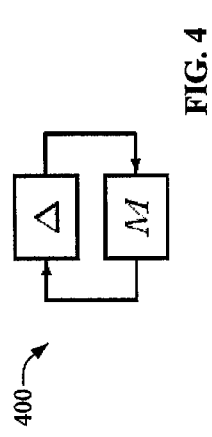
FIG. 4 illustrates a $\Delta$-M interconnection representing a closed-loop system in a robust control framework.

Using a robust control framework, the closed-loop can be represented by Δ-M interconnection 400 illustrated in FIG. 4, where M represents the closed-loop system as a function of the controller bandwidth (the design parameter), and Δ is the uncertainty due to variations inherent in the estimation of the parameters $K_S$ and $b_S$.

Given the above, a functional approximation of achievable controller bandwidths for a range of inertia and stiffness values can be derived. This functional approximation forms the basis for bandwidth model 218. For example, for a given range of parameter values $J_M$, $J_L$, and $K_S$, an iterative search algorithm can be developed to find bandwidth values that satisfy a robust stability constraint. In one or more embodiments, the stability criteria can be given by the structured singular value (SSV), known as mu-analysis, such that robust stability is guaranteed if:

$$\mu_\Delta(M) < 1 \quad (3)$$

In an exemplary system, the iterative search algorithm can determine robustly stabilizing controller bandwidth values over a range of inertia values ($J_M + J_L$) and stiffness values $K_S$ based on the following criteria:

$$\min_{a_1, a_2, a_3} \left\| Y - \left( \frac{a_1}{x} + a_2 x^2 + a_3 \right) \right\|^2 \quad (4)$$

where
Y represents the robust stability analysis,
$x = J_M + J_L$, and $$\frac{a_1}{x} + a_2 x^2 + a_3$$

represents one such desired functional form of the bandwidth (BW).

Figure 6:
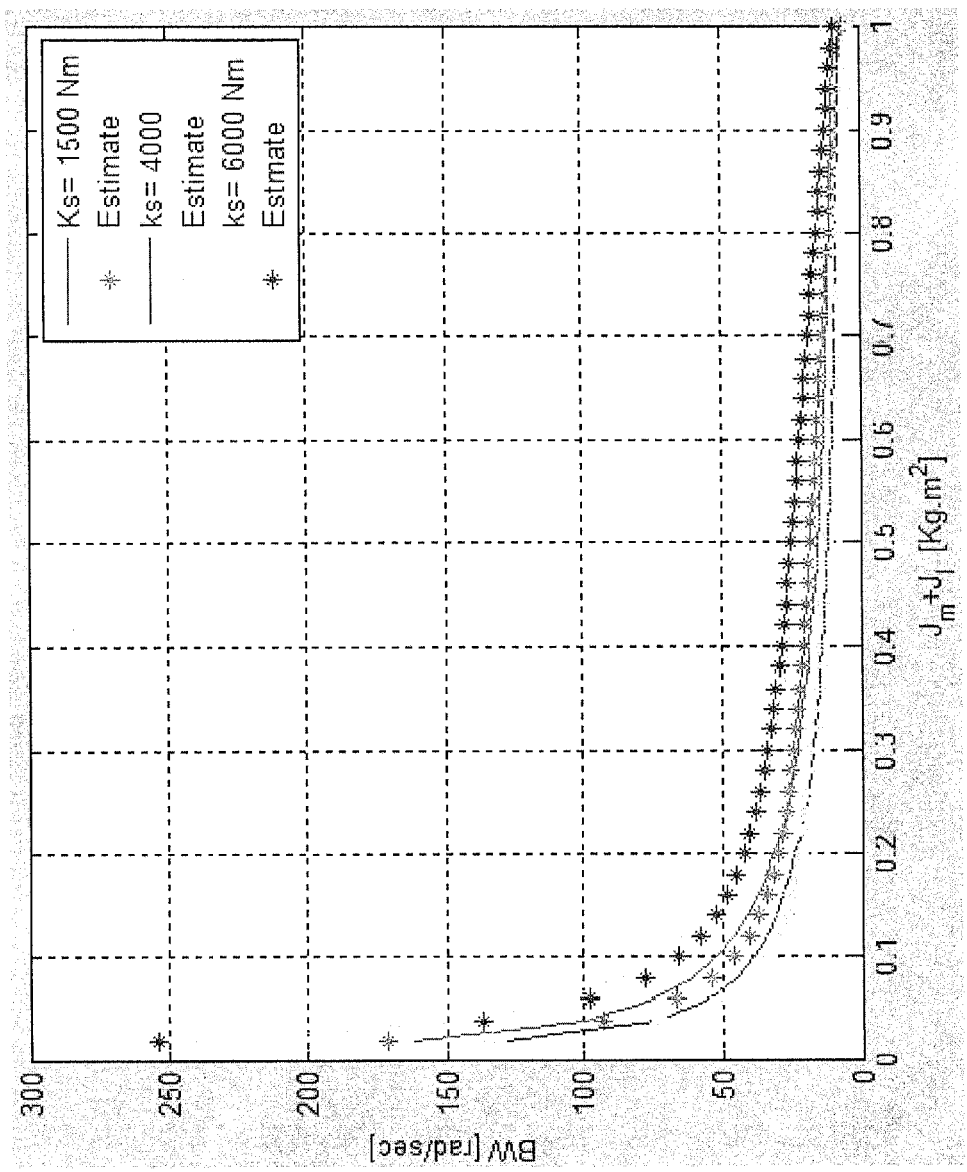
FIG. 6 is a graph representing an example functional relationship between robustly stabilizing bandwidth and system inertia.

The range of inertia values ($J_M + J_L$) and stiffness values $K_S$ over which the iterative search algorithm is performed can be selected to generally conform to the range of reasonable uncertainties for the type of motion system being examined. Once the iterative search algorithm represented by relationships (3) and (4) has yielded a set of achievable bandwidths for a range of inertias and stiffness values, curve fitting techniques (e.g., least squares or other such techniques) can be applied to the resulting set of values to obtain an approximate functional relationship between robustly stabilizing controller bandwidth and system inertia. FIG. 6 illustrates a graph of an example relationship derived using the techniques described above. As illustrated in FIG. 6, achievable bandwidth BW is plotted as a function of system inertia $J_M + J_L$ for various stiffness values $K_S$, where the individual plot points represent values derived by the iterative search algorithm and the lines represent an approximate functional relationship derived by applying curve fitting techniques to the data points.

Using these techniques, a generalized function for robustly stabilizing controller bandwidth is derived as a function of only two parameters—inertia and stiffness—as represented by the following functional form:

$$Bw(J_M + J_L; K_S) \quad (5)$$

Where Bw is the controller bandwidth, $J_M$ is the inertia of the motor, $J_L$ is the inertia of the load, and $K_S$ is the effective stiffness.

Although the foregoing example was described in context of an industrial motor drive in which the system gain is inertia and the dominant parameter is stiffness, it is to be appreciated that the techniques described herein are not limited to such systems, but rather are also applicable to other types of systems having other system gains and dominant parameters. In general, use of the iterative search techniques described above to quantify robustly stabilizing controller bandwidth as a function of system gain and the dominant parameter(s) of a system are within the scope of one or more embodiments of the present disclosure.

Figure 7:
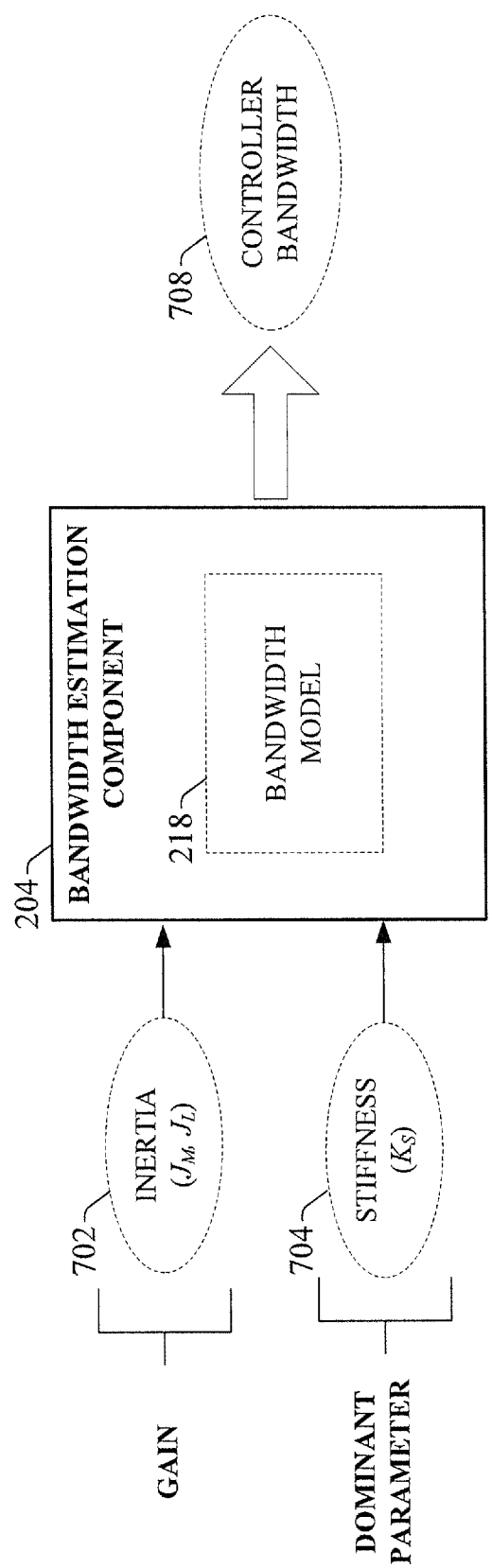
FIG. 7 is a block diagram illustrating derivation of a robustly stabilizing controller bandwidth by the bandwidth estimation component.

Once a functional relationship between achievable robustly stabilizing bandwidth and the system's dominant parameters is obtained (as exemplified by relationship (5) and the exemplary graph of FIG. 6), this relationship forms the basis of bandwidth model 218. That is, the derived relationship can be stored as bandwidth model 218 and subsequently accessed by the bandwidth estimation component 204 to determine a suitable robustly stabilizing controller bandwidth for a given motion application given only the system gain (e.g., inertia) and dominant parameter(s) (e.g., coupling stiffness and/or damping) of the system. FIG. 7 illustrates an example derivation of a robustly stabilizing controller bandwidth. Following from the previous example, bandwidth model 218 encodes functional relationship (5) derived above, which defines robustly stabilizing controller bandwidth as a function of system inertia (the system gain) and coupling stiffness (the dominant parameter that constrains the bandwidth). Bandwidth model 218 can be stored in any suitable format for access by bandwidth estimation component 204 (e.g., a lookup table that cross-references inertia and stiffness values with bandwidth values, a formula that can be provided with the estimated parameters to facilitate calculation of the bandwidth, etc.).

A system designer can feed estimated or measured values for a given system's inertia 702 and stiffness 704 to the controller bandwidth estimator. Given these estimated values, bandwidth estimation component 204 can reference bandwidth model 218 to determine a suitable controller bandwidth value 708 corresponding to the estimated values 702 and 704. Controller bandwidth value 708 represents the bandwidth defined by bandwidth model 218 as providing robust stability for the system given estimated inertia and stiffness values 702 and 704. This bandwidth value 708 can be used by the system designer to tune the controller for robust performance and stability. In some scenarios, the designer can use the calculated controller bandwidth value 708 as a guide to tune the individual controller gains until the prescribed bandwidth is achieved. In such examples, the controller bandwidth estimator may output the determined bandwidth value to a display (e.g., via interface component 212) so that the bandwidth value can be viewed and entered into a separate motion control or tuning application. In some embodiments, the controller bandwidth estimator may provide the determined bandwidth value directly to a motion controller, which can use the bandwidth value to set one or more gain coefficients based on the provided bandwidth value. In other scenarios, the controller may support single parameter tuning, wherein the controller bandwidth comprises the sole tuning parameter. This type of control— referred to herein as active disturbance rejection control, or ADRC—will be described in more detail below.

By leveraging the techniques described above, embodiments of the controller bandwidth estimation system can eliminate manual trial-and-error bandwidth tuning and enhance closed loop performance. Moreover, since the controller bandwidth estimation system simplifies the robustness functional form by describing robustly stabilizing controller bandwidth as a function of the mechanical inertia (or other system gain), system designers need not tune a controller to a conservatively low bandwidth in order to guarantee robust stability. The functional relationship between bandwidth and inertia given by functional relationship (5) is relatively static across the range of reasonable uncertainties. Hence, bandwidth model 218 can be easily implemented in a range of embedded control applications to facilitate robust and simplified controller design.

In the foregoing example, the estimated inertia and stiffness values can be obtained by any suitable means and provided to bandwidth estimation component 204. For example, system designers may estimate system inertia using manual calculations based on rated motor data and physical data (weight, dimensions, etc.) of the components comprising the load. Estimates of the inertia and stiffness may also be obtained based on measured data and provided to the bandwidth estimation system.

Figure 8:
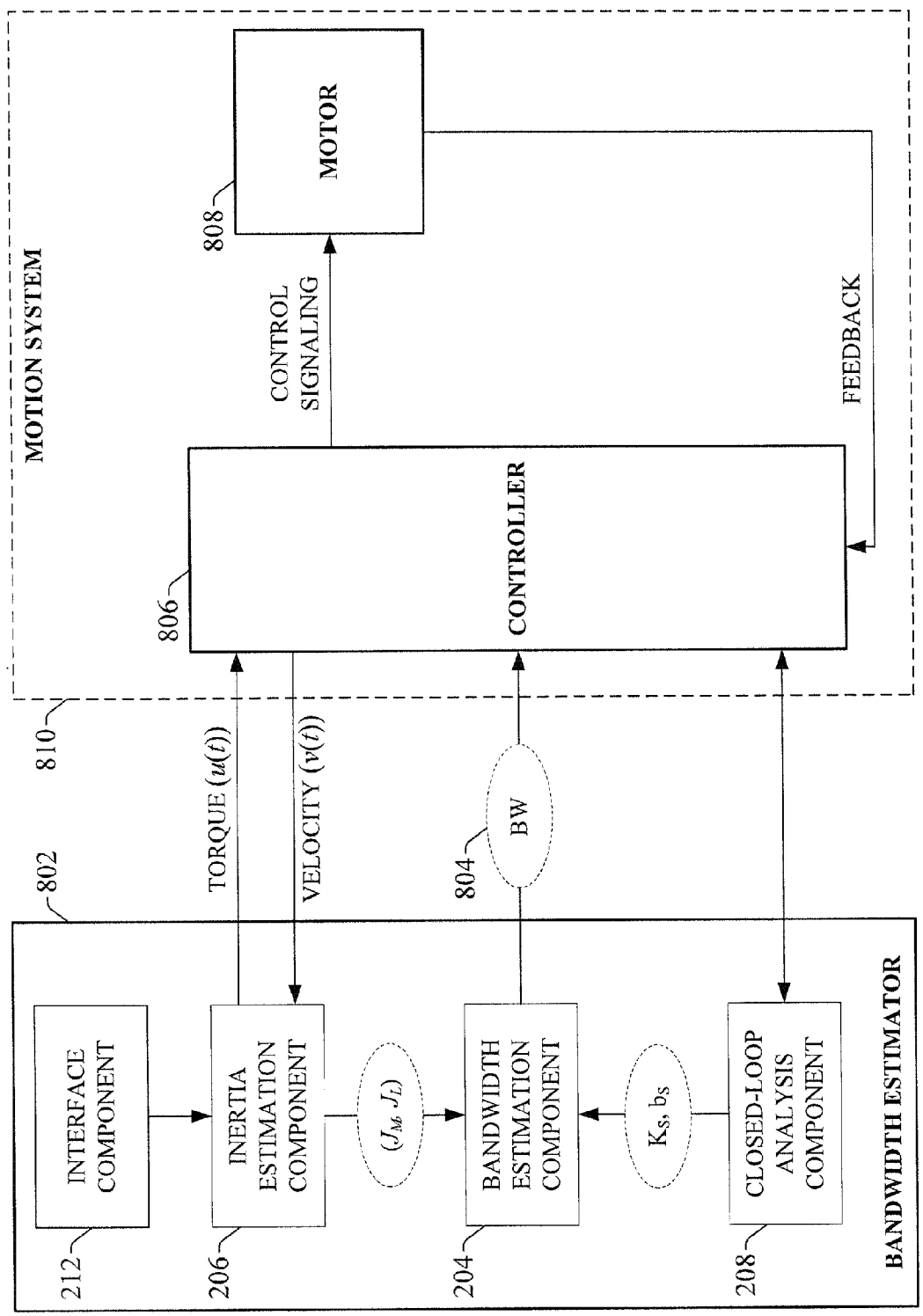
FIG. 8 illustrates an exemplary bandwidth estimation system that includes functionality for estimating inertia and stiffness.

In addition, one or more embodiments of the bandwidth estimation system described herein may include functionality that automatically estimates system inertia and/or coupling stiffness for a controlled mechanical system and provide these automatically derived estimates to the bandwidth estimation component 204. FIG. 8 illustrates an exemplary bandwidth estimation system that includes functionality for estimating inertia and stiffness. In this example, motion system 810 comprises a motor 808, which responds to control signaling issued by controller 806. Motor 808 is used to drive a load (not shown), such as a positioning axis, a rotational component of a machine, or other motor-driven load. Controller 806 monitors feedback signaling, which provides real-time state data for the motor 808 (e.g., position, speed, etc.).

As described in previous examples, bandwidth estimator 802 comprises a bandwidth estimation component 204 configured to calculate a robustly stabilizing controller bandwidth 804 for controller 806 given estimates of the inertia and coupling stiffness for the controlled mechanical system. In the present example, bandwidth estimator 802 also comprises an inertia estimation component 206 and a closed-loop analysis component 208 configured to automatically estimate the system inertia $J_M + J_L$ and the coupling stiffness for the controlled mechanical system $K_S$, respectively, for the controlled mechanical system.

In the illustrated example, bandwidth estimation component 204, inertia estimation component 206, and closed-loop analysis component 208 are depicted as a separate elements from controller 806 for clarity. For such configurations, any of components 204, 206, or 208 can exchange data with controller 806 or other elements of the motion system 810 via any suitable communications means, including but not limited to wired or wireless networking, hardwired data links, or other such communication means. In other embodiments, one or more of components 204, 206, or 208 can be integrated components of controller 806. For example, one or more of components 204, 206, or 208 can be functional components of the controller's operating system and/or control software executed by one or more processors residing on the controller 806. Components 204, 206, or 208 can also be hardware components residing within controller 806, such as a circuit board or integrated circuit, that exchanges data with other functional elements of the controller 806. Other suitable implementations are also within the scope of certain embodiments of this disclosure.

In one or more embodiments, inertia estimation component 206 can generate an estimate of the system inertia by running the controlled mechanical system through a testing sequence, measuring certain system parameters during the testing sequence, and calculating an inertia estimate based on the results. For example, inertia estimation component 206 can instruct controller 806 to send a torque control signal u(t) to motor 808, where the torque control signal varies continuously over time between defined maximum and minimum torque values. This torque control signal can be controlled based on a testing sequence defined for the inertia estimation component 206. In a non-limiting example, the testing sequence can specify that the torque control signal u(t) will increase gradually at a defined rate of increase, causing motor 808 to accelerate. In response to a defined trigger, the torque control signal can then gradually decrease back to zero, causing motor 808 to decelerate to a rest state.

During these acceleration and deceleration phases, the inertia estimation component 206 can measure and record the velocity v(t) of the motor 808 over time in response to the torque control signal u(t). Inertia estimation component 206 can then determine an estimated inertia J (e.g., $J_M + J_L$) for the mechanical system based on the time-varying torque signal u(t) and the measured velocity curve v(t). In some embodiments, inertia estimation component 206 can derive the estimated inertia by partitioning the u(t) and v(t) curves into acceleration and deceleration phases and estimating the inertia based on integrals of the respective acceleration and deceleration phases of the u(t) and v(t) curves.

Figure 9:
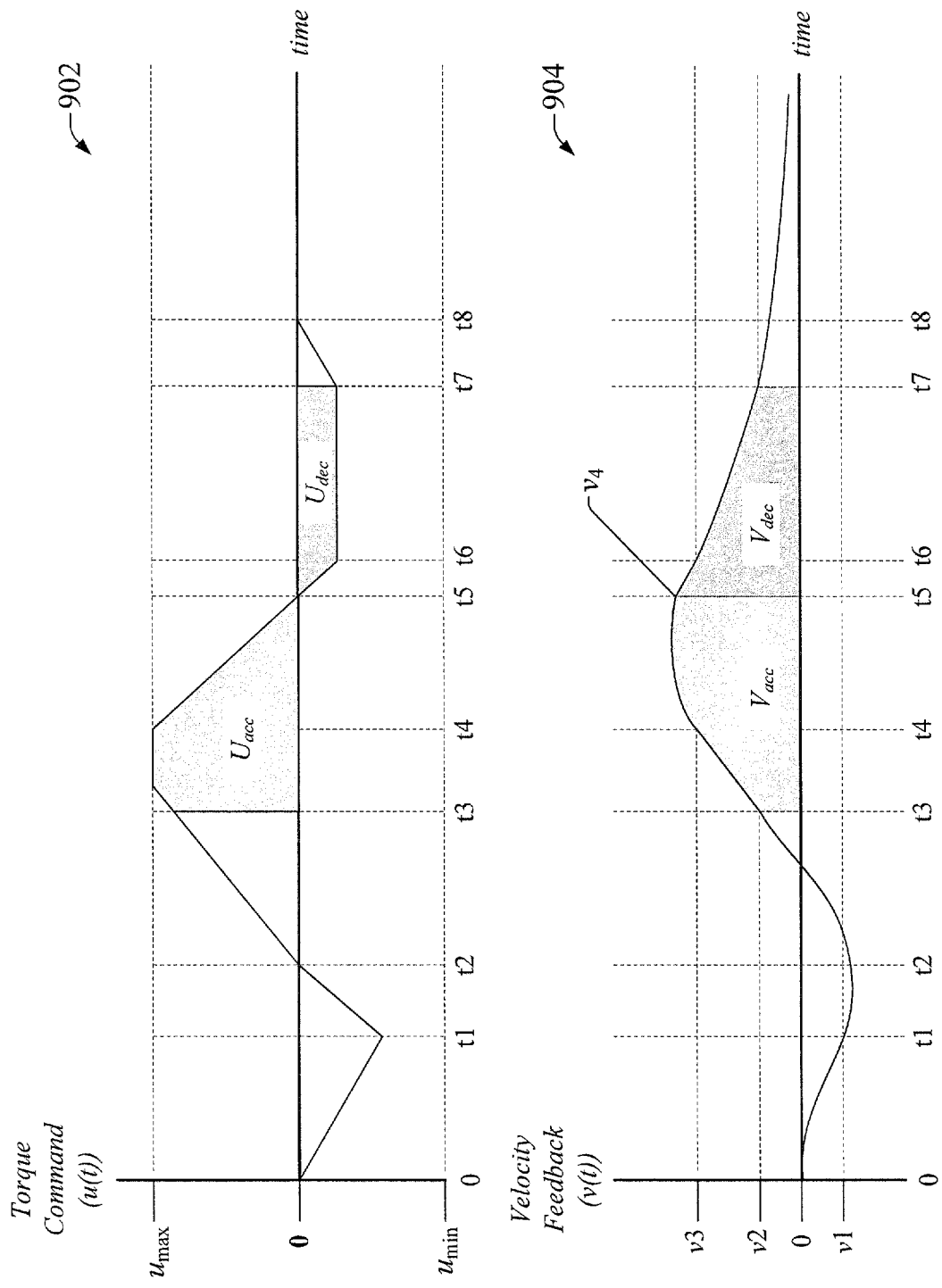
FIG. 9 illustrates an exemplary torque command u(t) and corresponding velocity feedback v(t) graphed over time.

In a non-limiting example of this technique, FIG. 9 illustrates exemplary an exemplary torque command u(t) and corresponding velocity feedback v(t) graphed over time as a result of the testing sequence. As shown on torque graph 902, the torque command signal u(t) is bounded by $u_{max}$ and $u_{min}$. Velocity checkpoints v1, v2, and v3, shown on velocity graph 904, determine phase transitions of the testing sequence. The values of $u_{max}$, $u_{min}$, v1, v2, and v3 can be defined by the user prior to testing (e.g., as user-defined parameters).

For the exemplary torque and velocity curves depicted in FIG. 9, the acceleration phase is taken to be the period starting when velocity v(t) reaches velocity checkpoint v2 for the first time (at time t=t3) and ending when torque signal u(t) crosses zero (at time t=t5). The velocity of the motion system at the end of this acceleration phase is recorded as v4 (as indicated on graph 904). The deceleration phase is taken to be the period starting when torque signal u(t) crosses zero (at time t=t5) and ending when velocity v(t) returns to v2 (at time t=t7). The inertia estimation component 206 can be configured to recognize these acceleration and deceleration phase delineations in order to derive the estimated inertia. It is to be appreciated that other criteria for delineating the acceleration and deceleration phases are also within the scope at certain embodiments of this disclosure.

Given these acceleration and deceleration phase definitions, the integrals of $u_{acc}(t)$ and $u_{dec}(t)$ are represented by the shaded regions of graph 902 labeled $U_{acc}$ and $U_{dec}$, respectively, and the integrals of $v_{acc}(t)$ and $v_{dec}(t)$ are represented as the shaded regions of graph 904 labeled $V_{acc}$ and $V_{dec}$, respectively.

Once the curves for u(t) and v(t) are derived, inertia estimation component 206 can estimate the inertia according to the following equation:

$$J = \frac{\int u_{dec}(t) \int v_{acc}(t) - \int u_{acc}(t) \int v_{dec}(t)}{\Delta v_{dec}(t) \int v_{acc}(t) - \Delta v_{acc}(t) \int v_{dec}(t)} \quad (6)$$

where the velocity deltas $\Delta v_{acc}(t)$ and $\Delta v_{dec}(t)$ are defined as:

$$\Delta v_{acc}(t) = v4 - v2 \quad (7)$$

and $$\Delta v_{dec}(t) = v2 - v4 \quad (8)$$

It is to be appreciated that the technique for estimating inertia described above is only intended to be exemplary, and that other suitable techniques are within the scope of one or more embodiments of this disclosure.

Once the estimated inertia has been calculated, inertia estimation component 206 can provide the estimated inertia to bandwidth estimation component 204 to facilitate determination of a robustly stabilizing controller bandwidth 804 for controller 806, as described in previous examples.

Some embodiments of bandwidth estimator 802 may also comprise a closed-loop analysis component 208 configured to determine estimates of the coupling stiffness of the mechanical system via closed-loop analysis. As noted above, the stiffness $K_S$ and damping $b_S$ characterize the flexible behavior of a two-inertia system. Estimates for these values can be derived using closed-analysis performed on the motor-load system.

Figure 10:
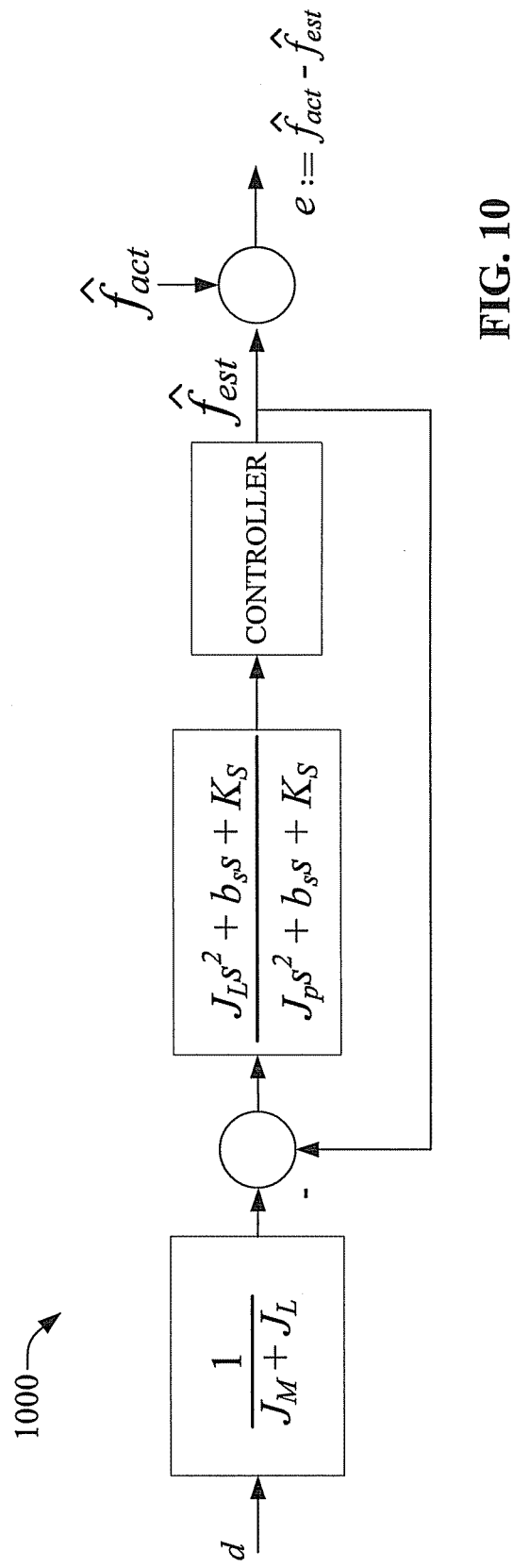
FIG. 10 illustrates an example closed-loop system that can be used to estimate unknown dominant constraints of a controlled system.

For example, given transfer function (1) above for the example two-inertia system modeled in FIG. 5, a closed-loop system similar to closed-loop system 1000 of FIG. 10 can be used to identify the unknown parameters $K_S$ and $b_S$. In closed-loop system 1000, d represents the input disturbance on the system, $\hat{f}_{est}$ represents the estimated disturbance estimated by the controller, $\hat{f}_{act}$ represents the actual disturbance, and e represents the error between the actual and estimated disturbances. Given the estimated inertia value, closed-loop system 1000 can be solved for the unknown parameters $K_S$ and $b_S$ to minimize the error e:

$$\min_{K_S, b_S, J_p} \|e\|^2 \quad (9)$$

Closed-loop analysis component 208 can perform the analysis of closed-loop system 1000 for the constraint given by (9) based on measurements of the actual system disturbances. Estimates of $K_S$ and/or $b_S$ (the dominant system constraints) derived using such closed-loop analysis can be provided to bandwidth estimation component 204 to facilitate calculation of controller bandwidth 804.

Figure 11:
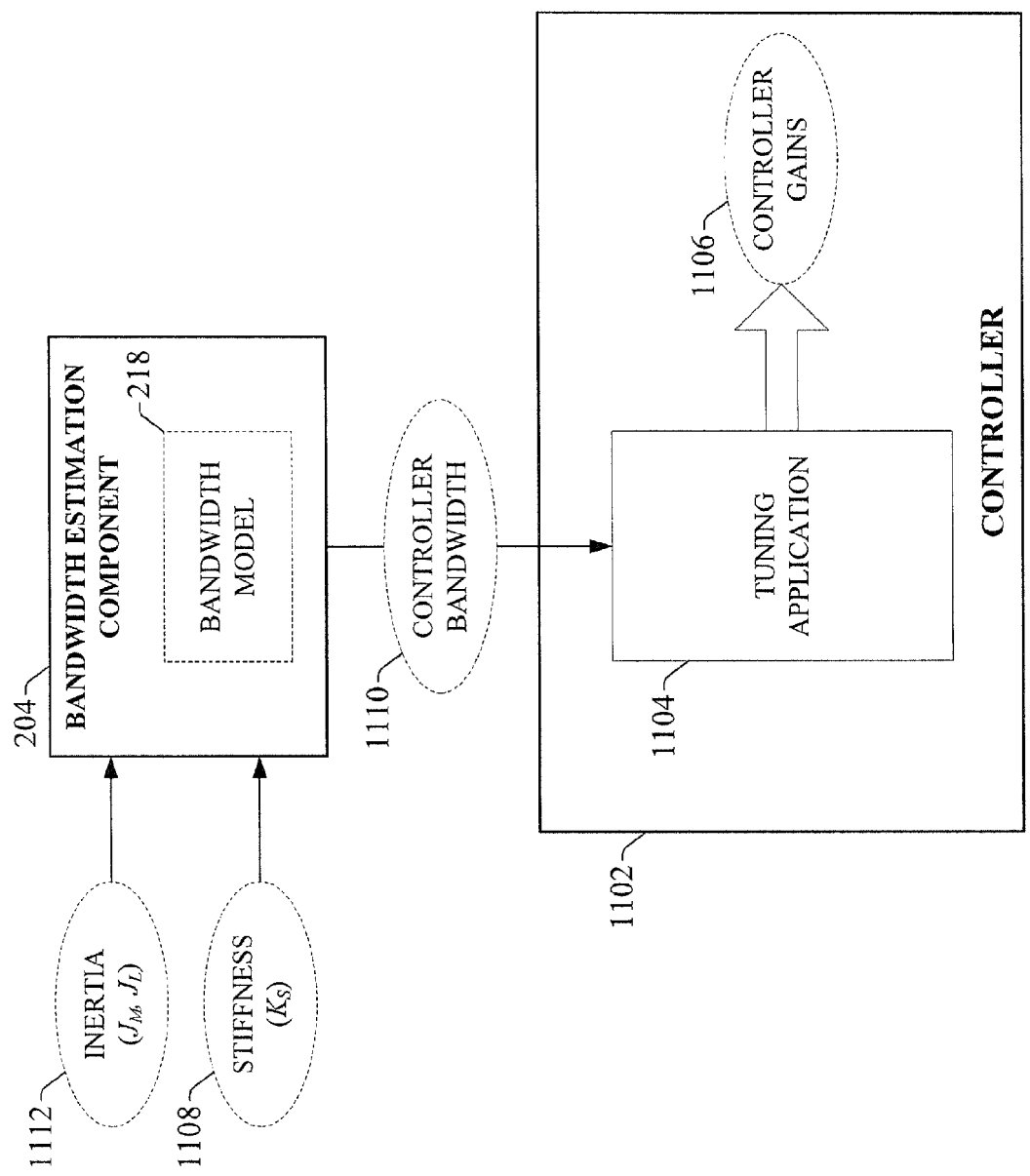
FIG. 11 is a block diagram of an exemplary motion control tuning application that utilizes the robustly stabilizing controller bandwidth generated by a bandwidth estimation component.

FIG. 11 illustrates an exemplary motion control tuning application that utilizes the robustly stabilizing controller bandwidth value generated by the bandwidth estimation component. In this example, a tuning application 1104 is used to tune controller gains for controller 1102, where the controller 1102 controls operation of a motor-driven motion system (not shown). Bandwidth estimation component 204 can determine a suitable controller bandwidth for controller 1102 according to the techniques described above. For example, bandwidth estimation component 204 can be provided with estimates of the inertia 1112 and stiffness 1108 of the controlled mechanical system. In one or more embodiments, these estimated parameters can be determined independently by the system designer and fed to bandwidth estimation component 204 manually. In other embodiments, one or more of the inertia 1112 or the stiffness 1108 can be estimated automatically or semi-automatically (e.g., using the inertia estimation component 206 and/or closed-loop analysis component 208 as described above) and subsequently provided to the bandwidth estimation component 204.

Bandwidth estimation component 204 can then determine a suitable controller bandwidth 1110 for the system characterized by inertia 1112 and stiffness 1108 by referencing bandwidth model 218, which has been derived a priori (e.g., using techniques described above) and which defines a functional relationship between robustly stabilizing bandwidth and system inertia for a range of stiffness values. Although the example illustrated in FIG. 11 depicts the controller bandwidth 1110 being determined as a function of inertia and coupling stiffness, it is to be appreciated that embodiments of the present disclosure are not limited to the types of systems for which the gain and dominant constraint are system inertia and coupling stiffness, respectively. Rather, embodiments of the bandwidth estimation component 204 that determine controller bandwidth based on a system's gain and dominant constraint(s) are within the scope of one or more embodiments of this disclosure.

Once a suitable controller bandwidth 1110 has been determined, bandwidth estimation component 204 can provide controller bandwidth 1110 to the tuning application 1104. Alternatively, bandwidth estimation component 204 can render the estimated controller bandwidth 1110 on a user interface, allowing a user to manually enter the controller bandwidth into the tuning application 1104. Tuning application 1104 can then set one or more controller gains 1106 based on the provided controller bandwidth 1110. In some embodiments, controller 1102 may support active disturbance rejection control (ADRC), whereby only a single tuning parameter (e.g., controller bandwidth 1110) needs to be optimized to facilitate tuning the controller for robust stable control, thereby simplifying the process of tuning of the control loop.

In some applications, the bandwidth estimation system described herein can be used to determine a robustly stabilizing controller bandwidth during initial deployment of the motion control system, prior to normal operation. Specifically, the bandwidth estimation system can be used in connection with configuring and tuning the controller bandwidth prior to runtime. Once set, the bandwidth typically remains fixed after system startup unless it is decided to re-tune the system at a later time. However, in some embodiments, the bandwidth estimation system can be configured to automatically re-calculate a suitable controller bandwidth periodically or continuously during runtime. Using such configurations, controller parameters that are based on the controller bandwidth value can be dynamically adjusted during normal operation, substantially in real-time, to compensate for gradual changes to the motion system's mechanical properties (e.g., as a result of mechanical wear and tear, changes to the load seen by a motor, etc.).

Figure 12:
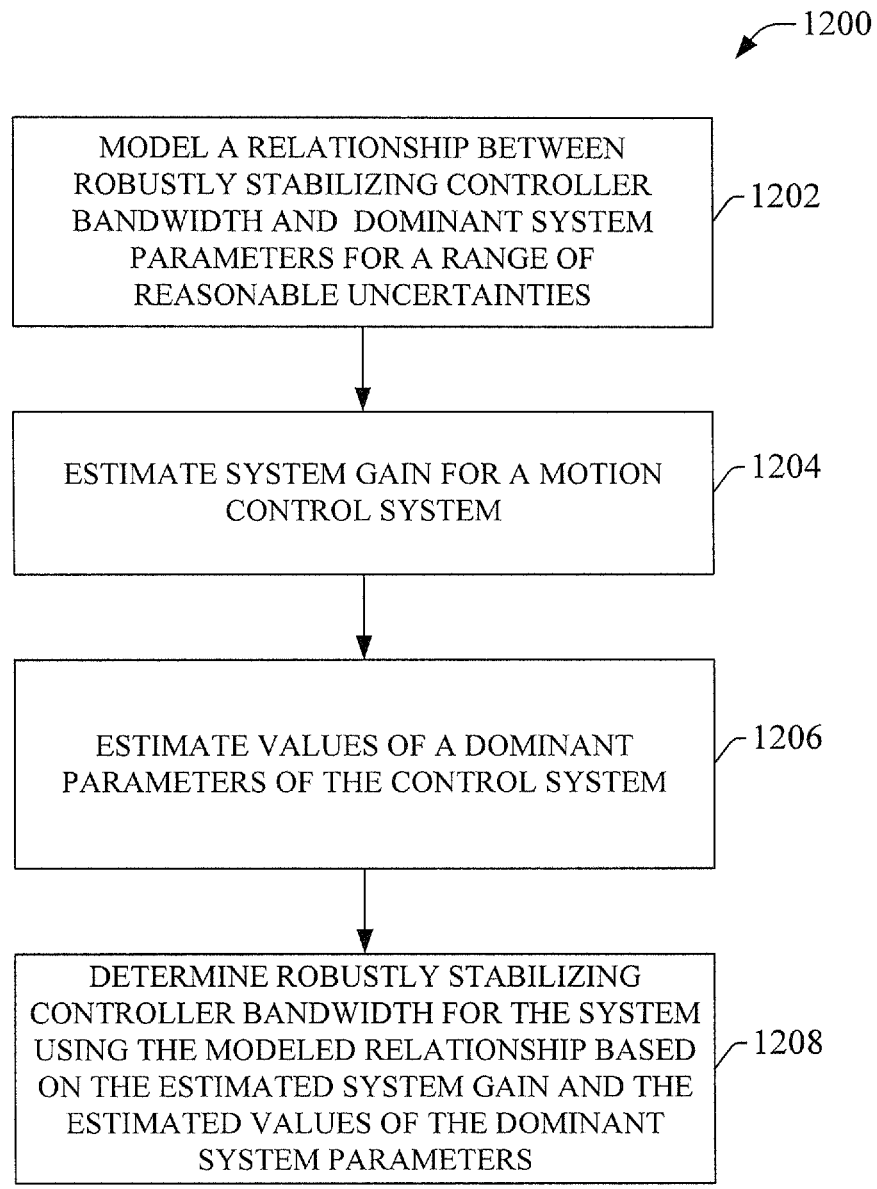
FIG. 12 is a flowchart of an example methodology for determining robustly stabilizing controller bandwidths given only estimates of the system's dominant parameters which define the constraints of a controlled system.
Figure 13:
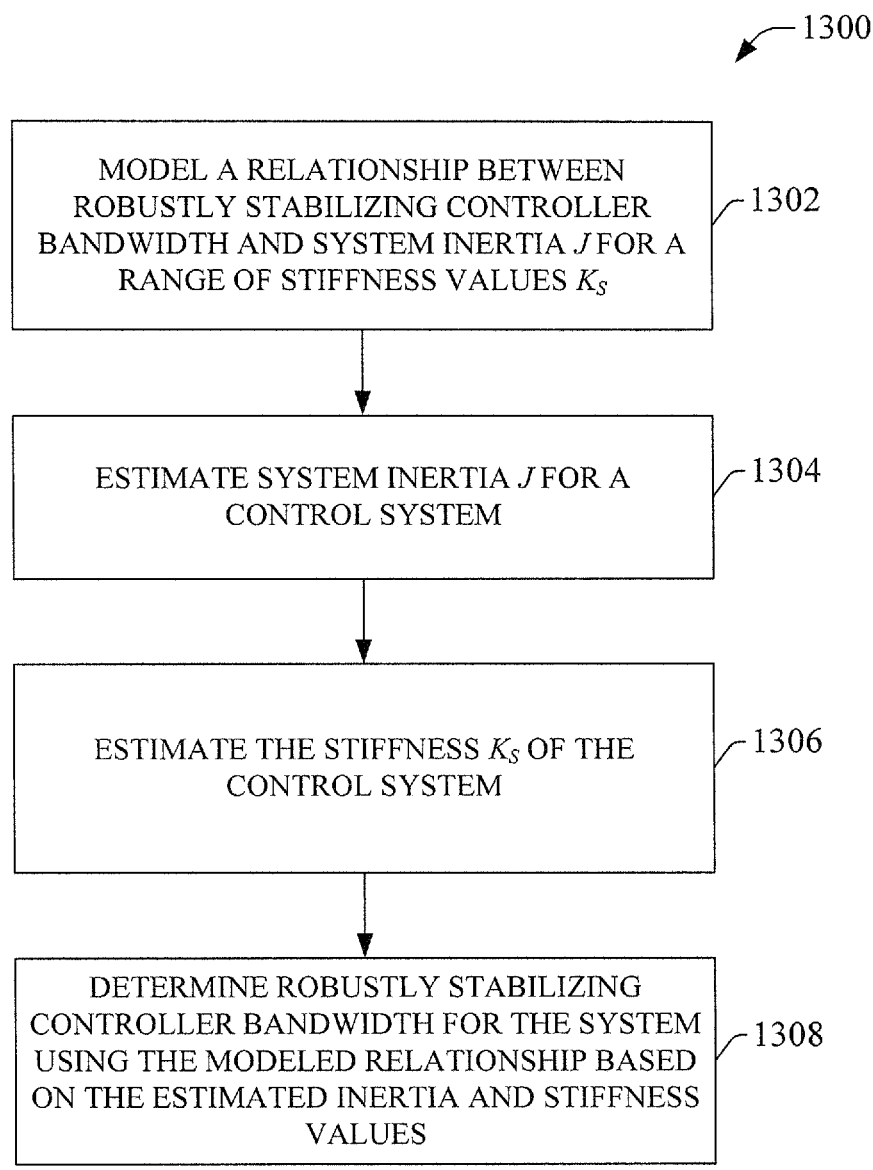
FIG. 13 is a flowchart of an example methodology for determining robustly stabilizing controller bandwidths for an example two-inertia system.

FIGS. 12-13 illustrate various methodologies in accordance with certain disclosed aspects. While, for purposes of simplicity of explanation, the methodologies are shown and described as a series of acts, it is to be understood and appreciated that the disclosed aspects are not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with certain disclosed aspects. Additionally, it is to be further appreciated that the methodologies disclosed hereinafter and throughout this disclosure are capable of being stored on an article of manufacture to facilitate transporting and transferring such methodologies to computers.

FIG. 12 illustrates an example methodology 1200 for determining robustly stabilizing controller bandwidths given only estimates of the system gain and dominant system parameters of a controlled system. Initially, at 1202, a relationship between robustly stabilizing controller bandwidth values and one or more dominant system parameters, which constrain the bandwidth values, is modeled for a range of reasonable uncertainties. At 1204, the system gain for a given motion control system is estimated. At 1206, estimated values for one or more dominant parameters of the control system are derived. In some embodiments, these estimates can be obtained via analysis of the closed-loop system. At 1208, a robustly stabilizing controller bandwidth for the control system characterized by the estimates obtained at steps 1204 and 1206 is obtained using the modeled relationship created at step 1202. In particular, a suitable controller bandwidth is obtained by providing only the estimated system gain and the estimated dominant parameter(s).

FIG. 13 illustrates an example methodology 1300 for determining robustly stabilizing controller bandwidths for an example two-inertia system. Initially, at 1302, a relationship between robustly stabilizing controller bandwidth is modeled as a function of system inertia J over a range of reasonable coupling stiffnesses $K_s$. At 1304, a system inertia J is estimated for a given control system. In one or more embodiments, the inertia J can be obtained independently by a system designer by any suitable means. Alternatively, the inertia J can be automatically or semi-automatically determined based on a measured response of the motion control system to a test control signal.

At 1306, a stiffness $K_S$ of the motion control system is estimated. The stiffness can be estimated, for example using closed-loop analysis of the motion system (e.g., the closed-loop analysis described in connection with FIG. 10). At 1308, a robustly stabilizing controller bandwidth for the motion control system is determined using the modeled relationship derived at step 1302 based on the estimated inertia and stiffness estimates obtained at steps 1304 and 1306, respectively.

Exemplary Networked and Distributed Environments

One of ordinary skill in the art can appreciate that the various embodiments described herein can be implemented in connection with any computer or other client or server device, which can be deployed as part of a computer network or in a distributed computing environment, and can be connected to any kind of data store where media may be found. In this regard, the various embodiments of the video editing system described herein can be implemented in any computer system or environment having any number of memory or storage units (e.g., memory 216 of FIG. 2), and any number of applications and processes occurring across any number of storage units. This includes, but is not limited to, an environment with server computers and client computers deployed in a network environment or a distributed computing environment, having remote or local storage. For example, with reference to FIG. 2, the bandwidth estimation component 204, inertia estimation component 206, closed-loop analysis component 208, and interface component 212 can be stored on a single memory 216 associated with a single device, or can be distributed among multiple memories associated with respective multiple devices. Similarly, bandwidth estimation component 204, inertia estimation component 206, closed-loop analysis component 208, and interface component 212 can be executed by a single processor 214, or by multiple distributed processors associated with multiple devices.

Distributed computing provides sharing of computer resources and services by communicative exchange among computing devices and systems. These resources and services include the exchange of information, cache storage and disk storage for objects. These resources and services can also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the various embodiments of this disclosure.

Figure 14:
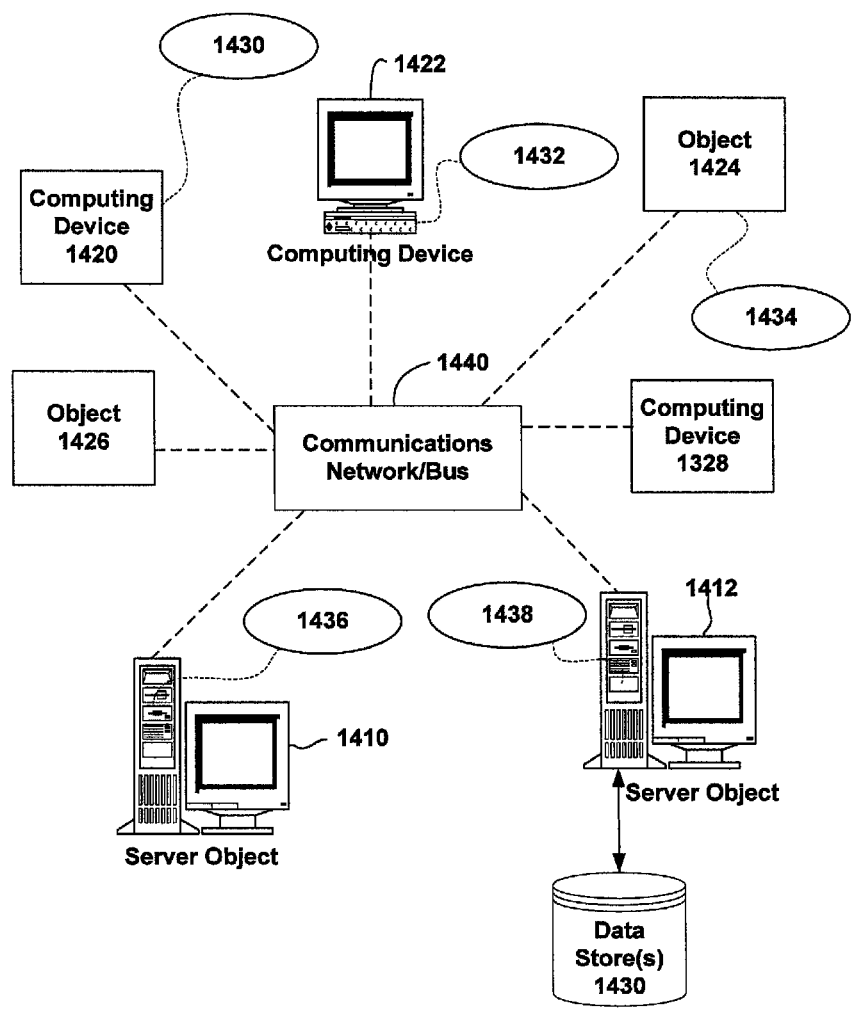
FIG. 14 is a block diagram representing an exemplary networked or distributed computing environment for implementing one or more embodiments described herein.

FIG. 14 provides a schematic diagram of an exemplary networked or distributed computing environment. The distributed computing environment includes computing objects 1410, 1412, etc. and computing objects or devices 1420, 1422, 1424, 1426, 1428, etc., which may include programs, methods, data stores, programmable logic, etc., as represented by applications 1430, 1432, 1434, 1436, 1438. It can be appreciated that computing objects 1410, 1412, etc. and computing objects or devices 1420, 1422, 1424, 1426, 1428, etc. may comprise different devices, such as personal digital assistants (PDAs), audio/video devices, mobile phones, MP3 players, personal computers, laptops, tablets, etc., where embodiments of the controller bandwidth estimator described herein may reside on or interact with such devices.

Each computing object 1410, 1412, etc. and computing objects or devices 1420, 1422, 1424, 1426, 1428, etc. can communicate with one or more other computing objects 1410, 1412, etc. and computing objects or devices 1420, 1422, 1424, 1426, 1428, etc. by way of the communications network 1440, either directly or indirectly. Even though illustrated as a single element in FIG. 14, communications network 1440 may comprise other computing objects and computing devices that provide services to the system of FIG. 14, and/or may represent multiple interconnected networks, which are not shown. Each computing object 1410, 1412, etc. or computing objects or devices 1420, 1422, 1424, 1426, 1428, etc. can also contain an application, such as applications 1430, 1432, 1434, 1436, 1438 (e.g., controller bandwidth estimator 202 or components thereof), that might make use of an API, or other object, software, firmware and/or hardware, suitable for communication with or implementation of various embodiments of this disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any suitable network infrastructure can be used for exemplary communications made incident to the systems as described in various embodiments herein.

Thus, a host of network topologies and network infrastructures, such as client/server, peer-to-peer, or hybrid architectures, can be utilized. The "client" is a member of a class or group that uses the services of another class or group. A client can be a computer process, e.g., roughly a set of instructions or tasks, that requests a service provided by another program or process. A client process may utilize the requested service without having to "know" all working details about the other program or the service itself.

In a client/server architecture, particularly a networked system, a client can be a computer that accesses shared network resources provided by another computer, e.g., a server. In the illustration of FIG. 14, as a non-limiting example, computing objects or devices 1420, 1422, 1424, 1426, 1428, etc. can be thought of as clients and computing objects 1410, 1412, etc. can be thought of as servers where computing objects 1410, 1412, etc. provide data services, such as receiving data from client computing objects or devices 1420, 1422, 1424, 1426, 1428, etc., storing of data, processing of data, transmitting data to client computing objects or devices 1420, 1422, 1424, 1426, 1428, etc., although any computer can be considered a client, a server, or both, depending on the circumstances. Any of these computing devices may be processing data, or requesting transaction services or tasks that may implicate the techniques for systems as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network 1440 is the Internet, for example, the computing objects 1410, 1412, etc. can be Web servers, file servers, media servers, etc. with which the client computing objects or devices 1420, 1422, 1424, 1426, 1428, etc. communicate via any of a number of known protocols, such as the hypertext transfer protocol (HTTP). Computing objects 1410, 1412, etc. may also serve as client computing objects or devices 1420, 1422, 1424, 1426, 1428, etc., as may be characteristic of a distributed computing environment.

Exemplary Computing Device

Figure 15:
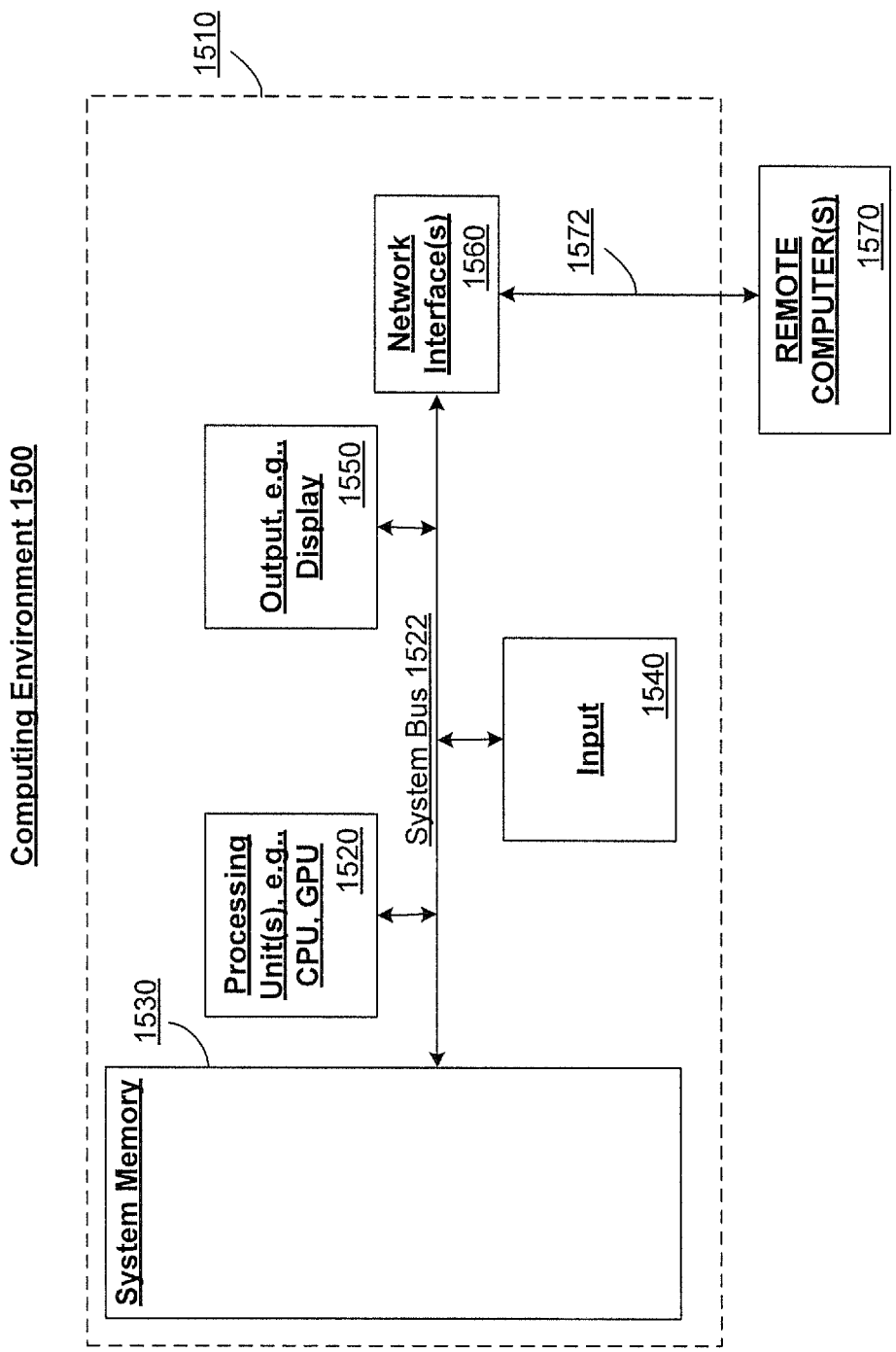
FIG. 15 is a block diagram representing an exemplary computing system or operating environment for implementing one or more embodiments described herein.

As mentioned, advantageously, the techniques described herein can be applied to any suitable device. It is to be understood, therefore, that handheld, portable and other computing devices and computing objects of all kinds are contemplated for use in connection with the various embodiments. Accordingly, the below computer described below in FIG. 15 is but one example of a computing device. Additionally, a suitable server can include one or more aspects of the below computer, such as a media server or other media management server components.

Although not required, embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

FIG. 15 thus illustrates an example of a suitable computing system environment 1500 in which one or aspects of the embodiments described herein can be implemented, although as made clear above, the computing system environment 1500 is only one example of a suitable computing environment and is not intended to suggest any limitation as to scope of use or functionality. Neither is the computing system environment 1500 be interpreted as having any dependency or requirement relating to any one or combination of components illustrated in the exemplary computing system environment 1500.

With reference to FIG. 15, an exemplary computing device for implementing one or more embodiments in the form of a computer 1510 is depicted. Components of computer 1510 may include, but are not limited to, a processing unit 1520, a system memory 1530, and a system bus 1522 that couples various system components including the system memory to the processing unit 1520. Processing unit 1520 may, for example, perform functions associated with processor(s) 214 of controller bandwidth estimator 202, while system memory 1530 may perform functions associated with memory 216.

Computer 1510 typically includes a variety of computer readable media and can be any available media that can be accessed by computer 1510. The system memory 1530 may include computer storage media in the form of volatile and/or nonvolatile memory such as read only memory (ROM) and/or random access memory (RAM). By way of example, and not limitation, system memory 1530 may also include an operating system, application programs, other program modules, and program data.

A user can enter commands and information into the computer 1510 through input devices 1540, non-limiting examples of which can include a keyboard, keypad, a pointing device, a mouse, stylus, touchpad, touchscreen, trackball, motion detector, camera, microphone, joystick, game pad, scanner, or any other device that allows the user to interact with computer 1510. A monitor or other type of display device is also connected to the system bus 1522 via an interface, such as output interface 1550. In addition to a monitor, computers can also include other peripheral output devices such as speakers and a printer, which may be connected through output interface 1550. In one or more embodiments, input devices 1540 can provide user input to interface component 212, while output interface 1550 can receive information relating to operations of controller bandwidth estimator 202 from interface component 212.

The computer 1510 may operate in a networked or distributed environment using logical connections to one or more other remote computers, such as remote computer 1570. The remote computer 1570 may be a personal computer, a server, a router, a network PC, a peer device or other common network node, or any other remote media consumption or transmission device, and may include any or all of the elements described above relative to the computer 1510. The logical connections depicted in FIG. 15 include a network 1572, such local area network (LAN) or a wide area network (WAN), but may also include other networks/buses e.g., cellular networks.

As mentioned above, while exemplary embodiments have been described in connection with various computing devices and network architectures, the underlying concepts may be applied to any network system and any computing device or system in which it is desirable to publish or consume media in a flexible way.

Also, there are multiple ways to implement the same or similar functionality, e.g., an appropriate API, tool kit, driver code, operating system, control, standalone or downloadable software object, etc. which enables applications and services to take advantage of the techniques described herein. Thus, embodiments herein are contemplated from the standpoint of an API (or other software object), as well as from a software or hardware object that implements one or more aspects described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the aspects disclosed herein are not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

Computing devices typically include a variety of media, which can include computer-readable storage media (e.g., memory 216) and/or communications media, in which these two terms are used herein differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function (e.g., coding and/or decoding); software stored on a computer readable medium; or a combination thereof.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is to be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In order to provide for or aid in the numerous inferences described herein (e.g. inferring audio segments), components described herein can examine the entirety or a subset of the data to which it is granted access and can provide for reasoning about or infer states of the system, environment, etc. from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines, etc.) can be employed in connection with performing automatic and/or inferred action in connection with the claimed subject matter.

A classifier can map an input attribute vector, $x=(x1, x2, x3, x4, xn)$, to a confidence that the input belongs to a class, as by $f(x)=\text{confidence}(\text{class})$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

In view of the exemplary systems described above, methodologies that may be implemented in accordance with the described subject matter will be better appreciated with reference to the flowcharts of the various figures (e.g., FIGS. 12 and 13). While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be effected across a plurality of devices. Accordingly, the invention is not to be limited to any single embodiment, but rather can be construed in breadth, spirit and scope in accordance with the appended claims.

What is claimed is:

1. A method for determining a controller bandwidth for a motion system, comprising:
   receiving, by a system comprising a processor, an estimated inertia value for the motion system;
   receiving, by the system, an estimated coupling stiffness value for the motion system;
   referencing, by the system, a bandwidth model that defines a relationship between controller bandwidth and inertia over a range of coupling stiffness values;
   determining, by the system based on the referencing, a controller bandwidth value for the motion system, the controller bandwidth being defined by the model as corresponding to the estimated inertia value and the estimated coupling stiffness value; and
   tuning the motion system based on the controller bandwidth value.

2. The method of claim 1, further comprising deriving, by the system, the bandwidth model using an iterative search algorithm that determines a set of bandwidth values for a range of inertia values that satisfy a robust stability constraint.

3. The method of claim 1, further comprising determining, by the system, the estimated inertia value based on a measured velocity for the motion system in response to an applied torque command signal.

4. The method of claim 3, wherein the determining the estimated inertia value comprises:
   generating the torque command signal, wherein the torque command signal varies continuously over time;
   measuring velocity data representing a velocity of the motion system in response to the torque command signal; and
   determining the estimated inertia value based at least in part on one or more first integrals of the velocity data over a time range and one or more second integrals of the torque command signal over the time range.

5. The method of claim 1, further comprising determining the estimated coupling stiffness value based on closed-loop analysis of the motion system.

6. The method of claim 1, further comprising determining at least one controller gain coefficient for the motion system based on the controller bandwidth value.

7. The method of claim 1, further comprising employing the controller bandwidth as a sole tuning parameter of the motion system.

8. A system for determining a robustly stabilizing controller bandwidth for a motion system, comprising:
   a memory;
   a processor configured to execute computer-executable components stored on the memory, the computer-executable components comprising:
      an interface component configured to receive an estimated inertia value for the motion system and an estimated coupling stiffness value for the motion system;
      a bandwidth estimation component configured to determine a controller bandwidth value for the motion system as a function of the estimated inertia value and the estimated coupling stiffness value, the bandwidth estimation component being configured to determine the controller bandwidth value based on a bandwidth model stored in the memory that models controller bandwidth values as a function of inertia for a range of coupling stiffness values; and
      a tuning component configured to tune the motion system based on the controller bandwidth value.

9. The system of claim 8, wherein the bandwidth model is based on a set of bandwidth values determined to satisfy a robust stability constraint for a corresponding set of system gain values.

10. The system of claim 8, wherein the computer-executable components further comprise an inertia estimation component configured to determine the estimated inertia value of based on a measured velocity of a motion device of the motion system in response to a torque command signal sent to the motion device.

11. The system of claim 10, wherein the inertia estimation component is further configured to:
   control the torque command signal to vary over time;
   measure velocity data for the motion device;
   determine one or more first integrals of the velocity data over a time range;
   determine one or more second integrals of the torque command signal over the time range; and
   determining the estimated inertia value as a function of the one or more first integrals and the one or more second integrals.

12. The system of claim 8, wherein the tuning component is configured to set at least one controller gain coefficient for the motion system based on the controller bandwidth value.

13. The system of claim 8, wherein the controller bandwidth value is a sole tuning parameter of the motion system.

14. The system of claim 8, wherein the computer-executable components further comprise a closed-loop analysis component configured to determine the estimated coupling stiffness value based on closed-loop analysis of the motion system.

15. The system of claim 8, wherein the motion system comprises at least one of a single-axis robot or positioning system, a multi-axis robot or positioning system, a pump, a washing machine, or a centrifuge.

16. A non-transitory computer-readable medium having stored thereon computer-executable instructions that, in response to execution, cause a computer system to perform operations, comprising:
 receiving a first value representing an estimated inertia of a motion system;
 receiving a second value representing an estimated coupling stiffness of the motion system;
 determining a controller bandwidth value for the motion system as a function of the first value and the second value, the determining comprises:
  referencing of a bandwidth model that defines a relationship between controller bandwidth and inertia over a range of coupling stiffness values; and
  selecting, as the controller bandwidth value, a bandwidth defined by the bandwidth model as corresponding to the first value and the second value; and
 tuning the motion system using the controller bandwidth value.

17. The non-transitory computer-readable medium of claim 16, wherein the tuning the motion system comprises using the controller bandwidth value as a sole tuning parameter.

18. The non-transitory computer-readable medium of claim 16, further comprising deriving the bandwidth model using an iterative search algorithm that determines a set of bandwidth values for a range of inertia values that satisfy a robust stability constraint.

19. The non-transitory computer-readable medium of claim 16, further comprising determining the estimated inertia based on a measured velocity for the motion system in response to a torque command signal applied to the motion system.

20. The non-transitory computer-readable medium of claim 16, further comprising determining the estimated coupling stiffness based on closed-loop analysis of the motion system.

* * * * *